(12) United States Patent
Shiraishi et al.

(10) Patent No.: US 9,082,370 B2
(45) Date of Patent: Jul. 14, 2015

(54) DISPLAY CONTROL DEVICE AND DATA PROCESSING SYSTEM

(71) Applicant: Renesas SP Drivers Inc., Kodaira-shi, Tokyo (JP)

(72) Inventors: Iori Shiraishi, Kodaira (JP); Kiichi Makuta, Kodaira (JP); Satoshi Saito, Kodaira (JP); Masaru Iizuka, Kodaira (JP)

(73) Assignee: SYNAPTICS DISPLAY DEVICES GK, Tokyo (JP)

( * ) Notice: Subject to any disclaimer, the term of this patent is extended or adjusted under 35 U.S.C. 154(b) by 71 days.

(21) Appl. No.: 14/066,685

(22) Filed: Oct. 29, 2013

(65) Prior Publication Data

US 2014/0118300 A1  May 1, 2014

(30) Foreign Application Priority Data

Oct. 30, 2012  (JP) ................................. 2012-239102

(51) Int. Cl.
  G09G 5/395  (2006.01)
  G06F 3/044  (2006.01)

(52) U.S. Cl.
  CPC ............... *G09G 5/395* (2013.01); *G06F 3/044* (2013.01)

(58) Field of Classification Search
  CPC ..... G06F 3/041; G06F 2203/041; G09G 3/36; G09G 3/3648; G09G 3/3696; G09G 5/39; G09G 5/395
  See application file for complete search history.

(56) References Cited

U.S. PATENT DOCUMENTS

| 5,020,115 | A | * | 5/1991 | Black | 382/298 |
| 5,619,226 | A | * | 4/1997 | Cahill, III | 345/667 |
| 5,963,262 | A | * | 10/1999 | Ke et al. | 348/447 |
| 2001/0009419 | A1 | * | 7/2001 | Ikeno et al. | 345/555 |
| 2002/0055215 | A1 | * | 5/2002 | Tamura et al. | 438/200 |
| 2004/0237110 | A1 | * | 11/2004 | Jones, Jr. | 725/74 |
| 2008/0316221 | A1 | * | 12/2008 | Aas | 345/544 |
| 2009/0002385 | A1 | * | 1/2009 | Blixt | 345/555 |
| 2011/0007796 | A1 | * | 1/2011 | Sugita | 375/240.01 |
| 2011/0134134 | A1 | * | 6/2011 | Yoshitake | 345/545 |
| 2012/0013758 | A1 | * | 1/2012 | Frederiksen et al. | 348/222.1 |
| 2012/0154370 | A1 | * | 6/2012 | Russell et al. | 345/214 |
| 2013/0251025 | A1 | * | 9/2013 | Smith, Roger | 375/240.02 |

FOREIGN PATENT DOCUMENTS

JP  2003-131622 A  5/2003

* cited by examiner

*Primary Examiner* — Joe H Cheng
(74) *Attorney, Agent, or Firm* — Miles & Stockbridge P.C.

(57) ABSTRACT

Provided is a display control device capable of coping with high-resolution display readily in terms of conducting data write and read on a frame buffer memory in time for the timing of display. The display control device has a plurality of line buffers, and is arranged so that a writing process for writing, into part of the line buffers, display lines of display data from outside, and a reading process for reading out written display lines of display data from other line buffers can be conducted in parallel. In the display control device, display-line data read out from the line buffers are compressed and stored in the frame buffer memory. The compression-display data read out from the frame buffer memory are read out for each line, and decompressed into display lines of display data. The decompressed display data are used to drive signal electrodes of a display device.

15 Claims, 5 Drawing Sheets

DISPLAY CONTROL DEVICE AND DATA PROCESSING SYSTEM

CROSS-REFERENCE TO RELATED APPLICATIONS

The present application claims priority from Japanese application JP 2012-239102 filed on Oct. 30, 2012, the content of which is hereby incorporated by reference into this application.

BACKGROUND

The present invention relates to a display control device and a data processing unit using the same, and a technique useful in application to a communication portable terminal device having a liquid crystal controller driver.

A liquid crystal controller driver performs control for writing display data supplied from a host device into a frame buffer memory out of synchronization with its internal operation timing, for reading display data written into the frame buffer memory in synchronization with the internal operation timing, and for driving signal electrodes of a liquid crystal panel while using the read display data to synchronize with the timing of display. In Japanese Unexamined Patent Publication No. JP-A-2003-131622, there is description about a technique for display data compression and storing on a frame buffer memory with the aim of increasing the CPU throughput required for write and read of display data on the frame buffer memory. Specifically, iterations of image data in display data are counted in units of pixels, and the top of the iterations and the number thereof are stored in combination as information of iteration. Then, using the information of iteration in reading display data, the readout of image data iterated can be omitted.

SUMMARY

The inventor has studied the way of meeting a problem that a memory operation for write and read on a frame buffer memory is made too late because of the increase in the size of display data to be written into the frame buffer memory, which is associated with the rise in the definition in terms of display image resolution or the increase in the size of a display screen image. As described in JP-A-2003-131622, such a situation can be improved to some extent by using a technique for compressing display data to be stored in a frame buffer memory and decompressing display data stored therein. On the other side, signal electrodes of a liquid crystal panel must be driven in synchronization with the timing of display by use of the decompression-display data and therefore, the processing time which can be spent for compression is limited to some extent. Further, there is a limit in speedup of the memory operation of a frame buffer memory, and it is required to achieve high resolution such as FHD (full high definition) on even a system with a small throughput such as a portable communication terminal device. Under the circumstances as described above, it has been found that simply compressing data is not all that's needed. In this connection, it has been found that an attempt to avoid the contention between write and read on a frame buffer memory by means of an arbitration circuit ends up just complexifying the logic of the arbitration circuit, and the avoidance of such contention is difficult to realize.

Therefore, it is an object of the invention to provide a display control device capable of coping with high-resolution display readily by conducting data write and read on a frame buffer memory in time for the timing of display. Further, it is an object to provide a data processing system with such a display control device.

The above and other problems of the invention and novel features thereof will become apparent from the description hereof, and the accompanying drawings.

Of the embodiments herein disclosed, a representative embodiment is as briefly described below.

That is, the display control device has a plurality of line buffers and is arranged so that a writing process for writing, into part of the line buffers, display lines of display data from outside, and a reading process for reading out written display lines of display data from other line buffers can be conducted in parallel. In the display control device, display meta data read out from the line buffers are compressed and stored in the frame buffer memory. The compression-display data read out from the frame buffer memory are read out for each line, and decompressed into display lines of display data. The decompressed display data are used to drive signal electrodes of a display device.

According to the embodiment, besides compressing display data and storing them in the frame buffer memory, display data are read out from the line buffers and compressed in parallel with the process of writing display data to be compressed into the line buffers. Therefore, the following can be conducted in time for the timing of display readily: a process which includes the steps of receiving and compressing display data from outside, and then writing the compressed display data into the frame buffer memory; and a reading process which includes the steps of reading compression-display data from the frame buffer memory.

Of the embodiment herein disclosed, the representative embodiment brings but the effect as briefly described below.

That is, in terms of conducting data write and read on a frame buffer memory in time for the timing of display, it is possible to cope with high-resolution display readily.

DETAILED DESCRIPTION

1. Summary of the Embodiments

The representative embodiment herein disclosed will be outlined first. Here, the reference numerals and character strings for reference to the drawings, which are accompanied with paired round brackets, only exemplify what the concepts of members or components referred to by the numerals or character strings contain.

[1] <Compression of Display Data Using Line Buffers Allocated to Adjacent Display Lines>

A display control device (4) according to an embodiment of the invention includes: a display data interface (21) which is supplied with display data from outside; a plurality of line buffers (51 to 54) serving as the buffer regions, and arranged so that a writing process for writing each display line of display data output from the display data interface into part of the buffer regions, and a reading process for reading out display lines of display data written therein from other parts of the buffer regions can be conducted in parallel; a compressing part (27) for compressing display-line data read out from the line buffers; a frame buffer memory (28) for storing compression-display data subjected to compression by the compressing part; a decompressing part (30) for reading out compression-display data from the frame buffer memory for each line, and decompressing the compression-display data into display lines of display data; and a driving part (31, 32) for outputting driving voltages for driving signal electrodes of a display device by use of decompressed display data.

According to the embodiment, besides compressing display data and storing them in the frame buffer memory, display data are read out from the line buffers and compressed in parallel with the process of writing display data to be compressed into the line buffers. Therefore, the following can be conducted in time for the timing of display readily: a process which includes the steps of receiving and compressing display data from outside, and then writing the compressed display data into the frame buffer memory; and a reading process which includes the steps of reading compression-display data from the frame buffer memory in addition, the readout executed in parallel with the writing on a line buffer is performed in units of a plurality of display lines of display data, which offers much time to spare to the process which includes compressing and writing on the frame buffer memory, and the process which includes the readout from the frame buffer memory, and the decompression, thereby enhancing the timing margin.

[2] <Alternately Using, in Pairs, Line Buffers Allocated to Four Lines>

In the display control device as described [1], the plurality of line buffers consist of four line buffers; the four line buffers are made a line buffer to write display data into in turn; and the four line buffers are made, in pairs, line buffers to read out display data from in parallel, provided that each pair of the line buffers are allocated to adjacent two display lines (PS1).

According to the embodiment, data compression with display data of adjacent display lines can be performed readily. Display data of adjacent display lines are suited to suppress the degradation of image quality in the case of image compression or the like because of pixels adjacent to each other.

[3] <Accumulation of Decompressed Display Data of One of Two Lines in Delay Buffer>

In the display control device as described in [2], the decompressing part outputs decompressed display data of one of two lines to the driving part while accumulating display data of the other line in the delay buffer (57), and then outputs the display data accumulated in the delay buffer to the driving part.

According to the embodiment, a useless decompressing operation can be eliminated, in sum, two display lines of display data obtained by one read of compression-display data from the frame buffer memory and one decompression subsequent thereto are used in series in terms of the display timing and therefore, the data are never wasted.

[4] <Data Read from the Line Buffers Faster than Data Write>

In the display control device as described in [3], readout of display data from the line buffers is faster than write of display data into the line buffers from the display data interface in speed.

According to the embodiment, control based on hand shaking by use of write and read permissions between a write operation and a read operation is never needed as long as the relation between the speeds as described above is satisfied.

[5] <Timing Generator>

The display control device as described in [4] further includes a timing generator (36), wherein each horizontal-scan period consists of a first cycle (R) ranging from its start to end of a predetermined number of clock cycles and a second cycle (W). Assuming this arrangement, the timing generator controls a process which includes the steps of outputting, to the driving part, display data of the accumulation buffer (PS4) and in parallel, reading out display data from the line buffers, supplying the read data to the compressing part to compress the data into compression-display data, and writing the compression-display data thus compressed into the frame buffer memory in the second cycle (PS1); a process which includes the steps of reading out the written compression-display data from the frame buffer memory to latch the read data in a line data latch circuit in the subsequent first cycle (PS2); and a process which includes the steps of reading out the latched compression-display data, supplying the read data to the decompressing part, and outputting the display data thus decompressed to the driving part and in parallel, writing the display data into the accumulation buffer (PS3) in the subsequent second cycle.

According to the embodiment, the required display control can be realized readily in terms of the timing by alternately executing the following processes respectively in synchronization with the horizontal-scan period: a process which includes the steps of compressing and writing display data in the course from the line buffers to the frame buffer memory, and outputting display data from the accumulation buffer to the driving part; and a process which includes the steps of reading out compression-display data from the frame buffer memory, decompressing the compression-display data, outputting the decompressed display data of one line to the driving part, and saving the decompressed display data of the other line by use of the accumulation buffer.

[6] <Compression of Display Data Using Line Buffers Allocated to Adjacent Display Lines>

A data processing system (1) according to another embodiment of the invention includes: a microcomputer (7) for executing a program; a display control device (4) for performing display control of display data supplied by the microcomputer; a display device (2) for displaying display data based on driving voltages output by the display control device; a touch panel (3) having a plurality of drive electrodes, plurality of detection electrodes, and a plurality of crossing parts formed by the drive and detection electrodes, and disposed on the display control device; and a touch panel controller (5) which drives the drive electrodes of the touch panel to detect a detection signal from each detection electrode. The display control device includes: a display data interface (21) which is supplied with display data from outside; a plurality of line buffers (51 to 54) serving as buffer regions, and arranged so that a writing process for writing each display line of display data output from the display data interface into part of the buffer regions, and a reading process for reading out display lines of display data written therein from other parts of the buffer regions can be conducted in parallel; a compressing part (27) for compressing display-line data read out from the line buffers; a frame buffer memory (28) for storing compression-display data subjected to compression by the compressing part; a decompressing part (30) for reading out compression-display data from the frame buffer memory for each line, and decompressing the compression-display data into display lines of display data; and a driving part (31, 32) for outputting voltages for driving signal electrodes of a display device by use of decompressed display data.

The above embodiment brings about the same effect and advantage as those the display control device as described in [1] does, and contributes to the simplification of display control in a data processing system and to reduction in system cost.

[7] <Alternately Using, in Pairs, Line Buffers Allocated to Four Lines>

In the data processing system as described in [6], the plurality of line buffers consist of four line buffers; the four line buffers are made a line buffer to write display data into in turn; and the four Line buffers are made, in pairs, line buffers to read out display data from in parallel, provided that each pair of the line buffers are allocated to adjacent two display lines (PS1).

The above embodiment brings about the same effect and advantage as those the display control device as described in [2] does.

[8] <Accumulation of Decompressed Display Data of One of Two Lines in Delay Buffer>

In the data processing system as described in [7], the decompressing part outputs decompressed display data of one of two lines to the driving part while accumulating display data of the other line in the delay buffer (57), and then outputs the display data accumulated in the delay buffer to the driving part.

The above embodiment brings about the same effect and advantage as those the display control device as described in [3] does.

[9] <Data Read from the Line Buffers Faster than Data Write>

In the data processing system as described in [8], readout of display data from the line buffers is faster than write of display data into the line buffers from the display data interface in speed.

The above embodiment brings about the same effect and advantage as those the display control device as described in [4] does.

[10] <Timing Generator>

In the data processing system as described in [9], the display control device as described in [4] further includes a timing generator (36), wherein each horizontal-scan period consists of a first cycle (R) ranging from its start to end of a predetermined number of clock cycles and a second cycle (W). Assuming this arrangement, the timing generator controls: a process which includes the steps of outputting, to the driving part, display data of the accumulation buffer (PS4) and in parallel, reading out display data from the line buffers, supplying the read data to the compressing part to compress the data into compression-display data, and writing the compression-display data thus compressed into the frame buffer memory in the second cycle (PS1); a process which includes the steps of reading out the written compression-display data from the frame buffer memory to latch the read data in a line data latch circuit in the subsequent first cycle (PS2); and a process which includes the steps of reading out the latched compression-display data, supplying the read data to the decompressing part, and outputting the display data thus decompressed to the driving part and in parallel, writing the display data into the accumulation buffer (PS3) in the subsequent second cycle.

The above embodiment brings about the same effect and advantage as those the display control device as described in [5] does.

[11] <Portable Communication Terminal Device>

The data processing system as described in any one of [6] to [10] further includes a high-frequency interface for performing high-frequency wireless communication under control of the microcomputer, which is formed as a portable communication terminal device (1).

2. Further Detailed Description of the Embodiments

The embodiments will be described further in detail.

<<Data Processing System>>

Figure 1:
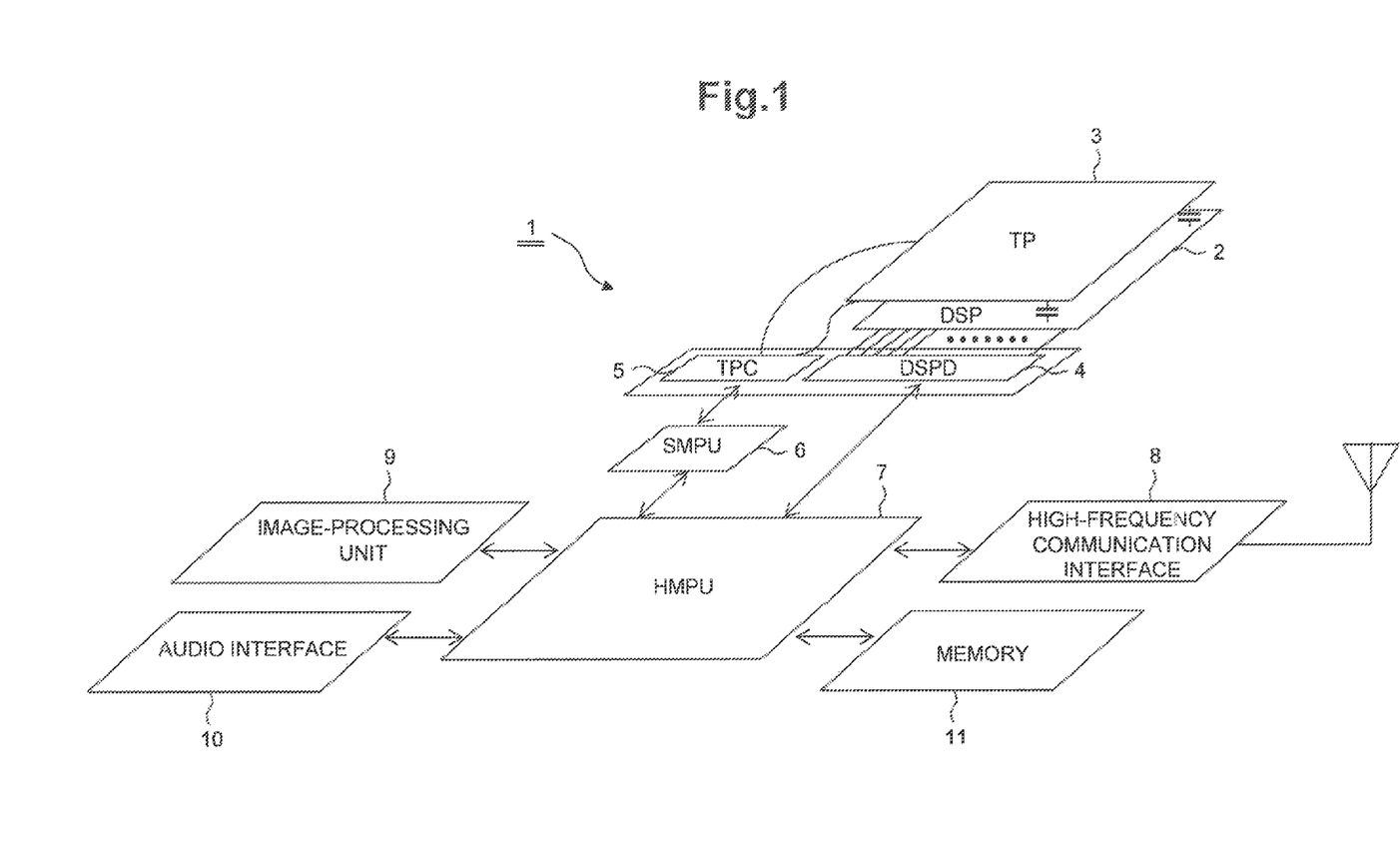
FIG. 1 is a block diagram showing, as an example, the entire structure of a communication portable terminal device.

FIG. 1 shows an example of the entire structure of a communication portable terminal device. The communication portable terminal device shown in the drawing is an embodiment of the data processing system, which is e.g. a portable telephone or a smart phone.

The communication portable terminal device 1 includes: a liquid crystal panel (DSP) 2 serving as a display device; a touch panel (TP) 3 serving as an input device; a liquid crystal controller driver (DPC) 4; and a touch panel controller (TPC) 5. The touch panel 3 is e.g. a mutual capacitance type touch panel which enables multi-touch detection, which has a plurality of drive electrodes, a plurality of detection electrodes, and a plurality of crossing parts formed by the drive and detection electrodes. The touch panel controller 5 supplies a drive pulse to the drive electrodes sequentially, and thus obtains detection data according to a change in the state of capacitive coupling at each crossing part based on signals sequentially taken from the detection electrodes.

The subprocessor (SMPU) 6, which is a microprocessor for a subsystem, controls the driving of the touch panel 3. The subprocessor 6 performs a digital filtering operation on detection data taken by the touch panel controller 5 to remove noise therefrom, and calculates, based on the resultant data, position coordinates of the crossing part where the capacitance is changed. That is, the subprocessor 6 calculates position coordinates when a contact event is occurring in order to indicate which position of the crossing part the stray capacitance has changed at, namely which position of the crossing part a finger has approached.

The touch panel 3 includes: transmissive (light transmissive) electrodes; and a dielectric film. For instance, the touch panel is superposed on the display plane of the liquid crystal panel 2.

The host processor (HMPU) 7 creates display data. The liquid crystal controller driver 4 receives display data from the host processor 7, and performs display control to display the data on the liquid crystal panel 2. The host processor 7 acquires data of position coordinates when a contact event is occurring from the subprocessor 6. The host processor 7 analyzes an input caused by an operation on the touch panel 3 from the relation between position coordinate data and a display image which the liquid crystal controller driver 4 having received display data from the host processor 7 makes the liquid crystal panel 2 display.

To the host processor 7, a high-frequency communication interface 8, an image-processing unit 9, an audio interface 10 to be connected to a microphone, or a speaker, a memory 11 are connected. The host processor 7 performs application processes including display control and input control as well as a baseband process or high-frequency communication, thereby materializing a control function as a communication portable terminal device.

Although no special restriction is intended, the liquid crystal panel 2 is a dot matrix panel having lots of display pixels arranged like a matrix. The liquid crystal panel 2 has scan electrodes (gate lines) and signal electrodes (source lines)

arranged like a matrix, and a TFT (Thin Film Transistor) switch formed at each intersection of the scan and signal electrodes. The TFT switch has a gate connected with the scan electrode, and a drain connected with the signal electrode. On the source side of the TFT switch, a liquid crystal pixel electrode of a liquid crystal capacitance included in a sub-pixel is connected. An electrode of each liquid crystal capacitance on the opposite side is composed of a common electrode. The signal electrodes are supplied with a signal voltage output by the liquid crystal controller driver 4. The gate electrodes accept a scanning pulse from the liquid crystal controller driver 4 e.g. in the order that in which they are arrayed, and thus they are activated.

The liquid crystal controller driver 4 is an embodiment of the display control device, which performs control for compressing display data supplied from the host processor 7 out of synchronization with the internal operation timing to write the compression-display data into the frame buffer memory, for reading the compression-display data written into the frame buffer memory in synchronization with the internal operation timing to decompress the read display data, and for driving the signal electrodes of the liquid crystal panel 2 while using the decompression-display data to synchronize with the timing of display. The liquid crystal controller driver 4 may be arranged to perform display control according to a video display mode for displaying, on the liquid crystal panel 2, display data supplied together with the timing of display, such as a one-segment TV or videophone image, the description of which is skipped here.

The audio interface 10, the host processor 7, the image-processing unit 9, the memory 11, the high-frequency communication interface 8, and the subprocessor can be composed of a one-chip semiconductor device of System On Chip, or multiple chips of semiconductor devices.

The display control by the liquid crystal controller driver 4 accompanied by compression and decompression of display data will be described below in detail.

<<Liquid Crystal Controller Driver>>

Figure 2:
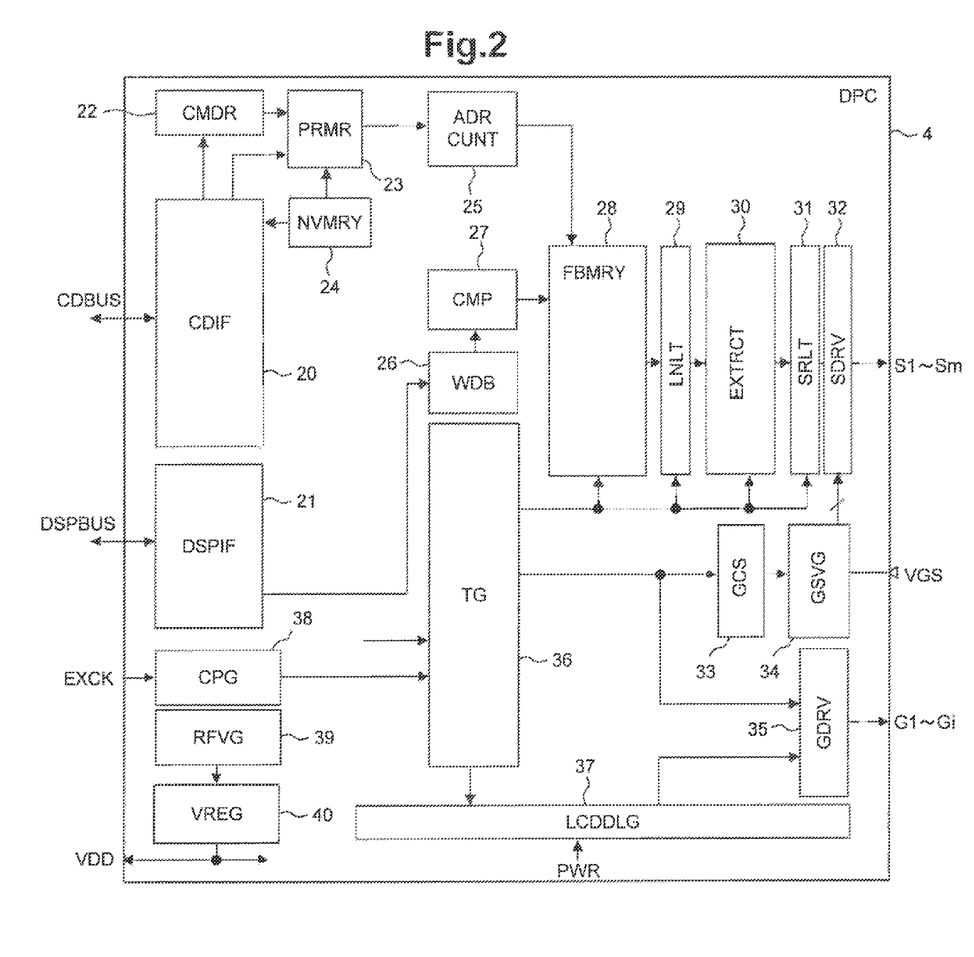
FIG. 2 is a block diagram showing, as an example, the structure of a liquid crystal controller driver.

FIG. 2 shows an example of the structure of the liquid crystal controller driver 4. Herein, the liquid crystal controller driver 4 drives the dot matrix type liquid crystal display panel 2. The liquid crystal controller driver 4 has a frame buffer memory (FBMRY) 28 for memorizing display data to be displayed on the dot matrix type liquid crystal display panel by a bit-map method. The frame buffer memory 28 is composed of e.g. SRAM.

The liquid crystal controller driver 4 includes: a command register (CMDR) 22 as a control part for controlling the inside based on an instruction from the external host processor 7; and a parameter register (PRMR) 23 serving as a sequencer. Also, the liquid crystal controller driver 4 includes: a pulse generator (CPG) 38 which generates a reference clock pulse based on an oscillation signal from the outside or an oscillation signal from a vibrator connected to an external terminal; and a timing generating circuit (TG) 36 which generates a timing signal for providing an operation timing of each of various circuits inside the chip based on the clock pulse. The host processor 7 is connected to a command-data interface (CDIF) 20 through a command data bus CDBUS, and connected to a display interface (DSPIF) 21 through a display bus DSPBUS. The command-data interface 20 receives command data and other control data from the host processor 7.

The display interface 21 receives display data from the host processor. As to display data, e.g. one pixel represents a total of 24 bits of RGB data with each color assigned eight bits. The received display data are temporarily stored in a write data buffer (WDB) 26 having a plurality of line buffers. The stored display data are subjected to compression by the compressing part (CMP) 27, and then stored in the frame buffer memory 28. The address counter (ADRCOUNT) 25 creates a write address to the frame buffer Memory 28 according to control data output from the parameter register 23.

The compression-display data written into the frame memory 28 are read out therefrom into a line latch circuit (LNLT) 29 in units of display lines; the address counter 25 creates a read address as well. The compression-display data latched by the line latch circuit 29 are decompressed by a decompressing part 30. The decompression-display data are latched by the source latch (SRLT) 31 in synchronization with the timing of display. Based on the latched display data, the signal electrode drive circuit (SDRV) 32 selects gradation voltages generated by the gradation voltage generating circuit (GSVG) 34, and outputs signal voltages S1-Sm to the signal electrodes of the liquid crystal panel 2. The selected gradation voltages have been corrected by the gamma regulator circuit for correcting re gamma curve of the liquid crystal panel.

The scan electrode drive circuit (GDRV) 35 scans and drives the scan electrodes of the liquid crystal panel 2 by sequentially applying, to the scan electrodes, scan voltages G1 to Gi produced by the liquid crystal drive-level generating circuit (LCDDLG) 37. The liquid crystal drive-level generating circuit 37 produces drive levels based on a plurality of source voltages PWR.

Although no special restriction is intended, the parameter register 23 is composed of a memory circuit in which a number of pieces of control information for controlling operations of the liquid crystal controller driver 4 are stored. The command register 22 is a register into which index information for making reference to control information in the parameter register 23 is written. The control information is read out from the parameter register 23 based on index information which the host processor 7 set in the command register 22. The index information is characterized as mode data or command data. The control information referred to by index information includes an initial value set on the address counter 25, and a start enable signal to the timing generating circuit 36. According to a start enable signal so supplied, the timing generating circuit 36 provides each part of the liquid crystal controller driver 4 with an internal control signal necessary for display control or the like.

In this way, the liquid crystal controller driver 4 executes, in synchronization with the timing of display, the display control which includes the steps of: taking, in the write data buffer 26, display data supplied to the display interface 21 by the host processor 7, followed by compression thereof; sequentially writes the compressed data into the frame buffer memory 28; and decompressing the written data for display. The display control operation of the liquid crystal controller driver 4 compressing, through the buffers 51 to 54, display data input from the host processor 7 out of synchronization with an internal clock, and driving the signal electrodes in synchronization with the internal clock while expanding the compressed data into the display frame will be described below in detail.

<<Display Control Operation Including Compressing Display Data Through Buffers>>

Figure 3:
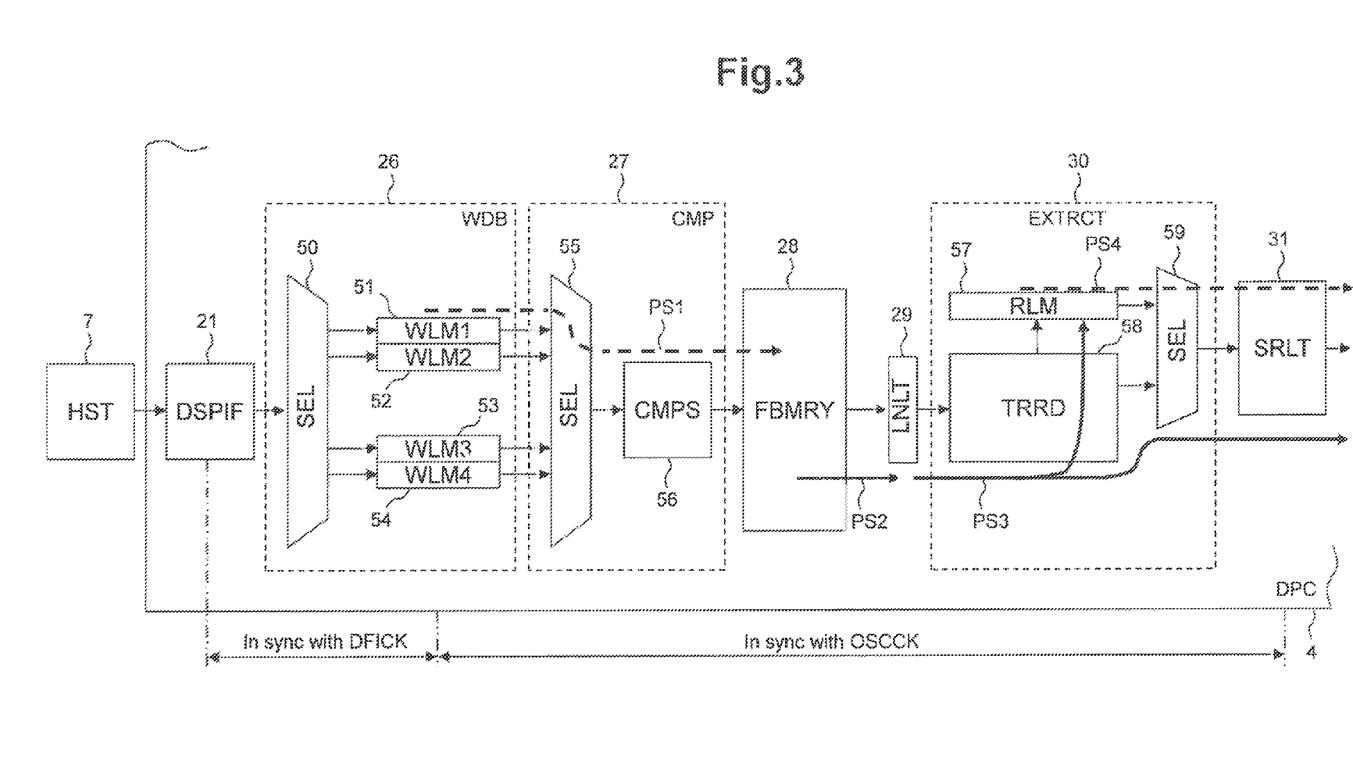
FIG. 3 is a block diagram showing, as an example, the detail of a display data-processing path extending from a display interface to a source latch in the LC driver controller.

FIG. 3 shows, an example, the detail of a display data-processing path extending from the display interface 21 to the source latch 31 in the LC driver controller 4.

Display data are input to the display interface 21 in synchronization with an operation clock of the host processor 7 in units of pixels, namely 24 bits with each color of R, G and B assigned 8 bits. The input display data are supplied to the write data buffer 256.

The write data buffer 26 has e.g. a selector 50 and four write-line buffers (WLM1 to WLM4) 51 to 54. For the sake of convenience of description, the write-line buffers 51 to 54 are also denoted by WLM1 to WLM4 as the write-line buffers. WLM1 to WLM4. The selector 50 switches, among the write-line buffers 51 to 54, the write-line buffer to write display data into for every number of pixels of one display line of the frame buffer memory 28 (every beta bit number corresponding to the number of pixels of 24×1 display lines, in this embodiment). Display data input from the selector 50 are written into the write-line buffers (WLM1 to WLM4) 51 to 54 in every horizontal-scan period. The timing of writing individual pieces of data is synchronized with the timing of the host processor 7 supplying display data in every horizontal-scan period. Specifically, display data corresponding to the number of pixels of one display line are sequentially written into the write-line buffer WLM1 in a certain horizontal-scan period. After the completion of the writing to the write-line buffer WLM1, subsequent display data corresponding to the number of pixels of one display line are sequentially written into the write-line buffer WLM2 in the next horizontal-scan period. In the same way in the subsequent horizontal-scan periods, the write-line buffer is sequentially switched, and display data are written thereinto. The timing generating circuit 36 has the control of the selection by the selector 50, and the control of the writing.

Figure 4:
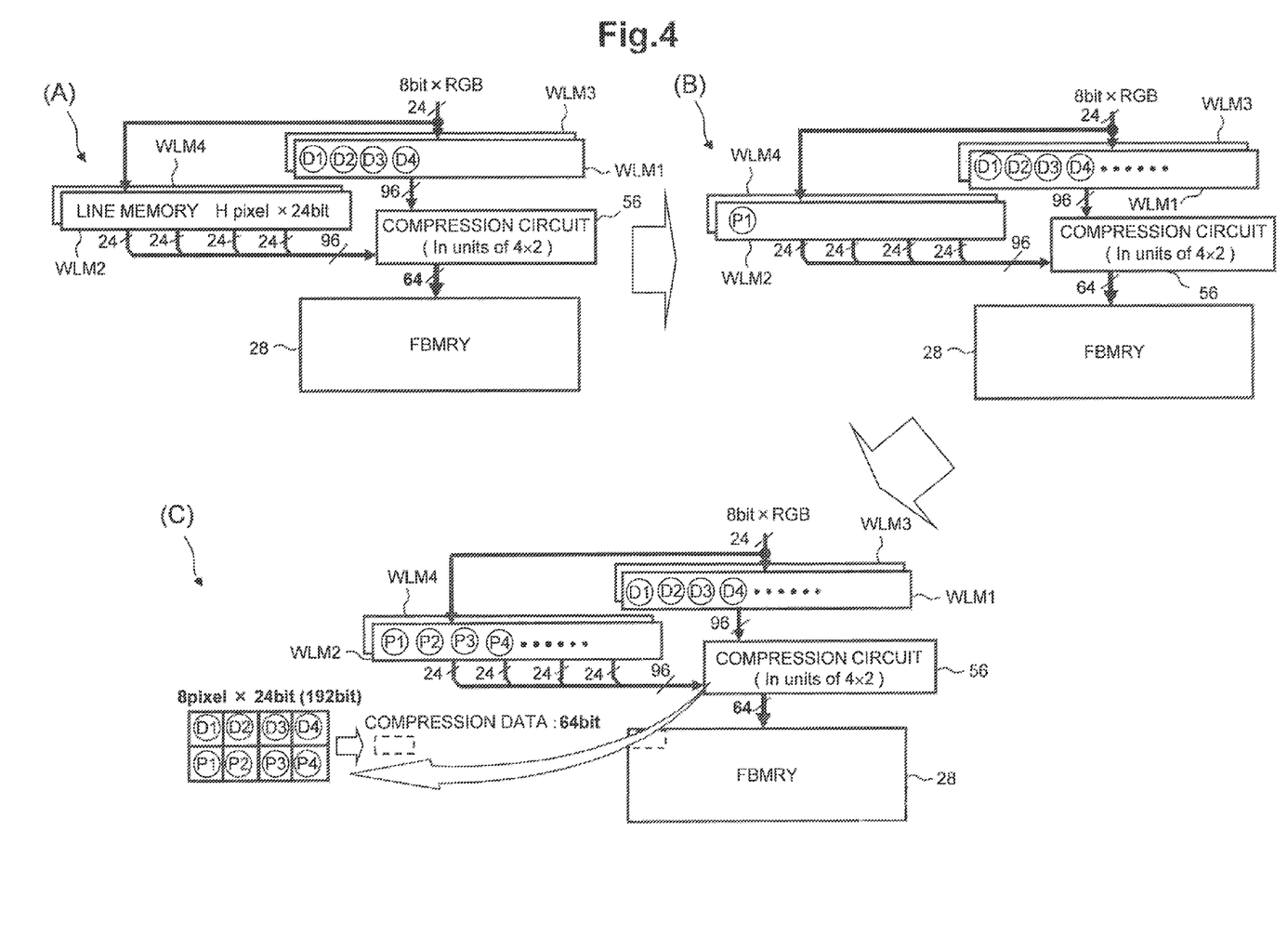
FIG. 4 is an explanatory diagram schematically showing a processing flow of a compressing process.

The compressing part 27 has a selector 55 and a compression circuit 56. When one display line of display data is stored in each of the write-line buffers WLM1 and WLM2, the selector 55 accepts, as inputs, the stored display data from the write-line buffers WLM1 and WLM2 in parallel, and then passes the display data to the compression circuit 56. Even while display data are being output from the write-line buffers WLM1 and WLM2 in parallel, the writing of display data to each of the other write-line buffers WLM3 and WLM4 is continued. Likewise, when one display line of display data is stored in each of the write-line buffers WLM3 and WLM4, the stored display data are supplied, in parallel, to the compression circuit 56 from the write-line buffers WLM3 and WLM4 Even while display data are being output from the write-line buffers WLM3 and WLM4 in parallel, the writing of display data to each of the other write-line buffers WLM1 and WLM2 is continued. The compression circuit 56 compresses two display lines of display data input in parallel according to a predetermined compression algorithm, and writes the compression-display data into the frame buffer memory 28. For instance, display data of a display line at an even line address are first written into the write-line buffer WLM1 as shown in the part (A) of FIG. 4. Then, as shown in the part (B), display data of a display line at an odd line address are written into the write-line buffer WLM2. Then, as shown in the part (C), a total of 8 pixels of data (3×8×4 bits+3×8×4 bits=192 bits) consisting of a pair of 4-pixel display data of the write-line buffer WLM1 and 4-pixel display data of the write-line buffer WLM2 are compressed into one third, namely 64 bits. Compression-display data having been compressed for each pair of display lines of data are written into one frame buffer line corresponding to the pair of display lines. In the drawing, D1, D2, D3, and D4 each represent 24 bits of pixel data stored in the write-line buffer WLM1, and P1, P2, P3, and P4 each represent 24 bits of pixel data stored in the write-line buffer WLM2.

The decompressing part 30 has a decompression circuit (TRRD) 58; a read-line buffer (RLM) 57 serving as a delay buffer; and a selector 59. The decompression circuit 58 accepts, as inputs, compression-display data read out from the frame buffer memory 28 by the line latch 29 for each line, and decompresses, in units of 64 bits, the input display data into 96 bits of 4-pixel data for each display line of a pair of display lines. The decompression-display data of the even display line selected by the selector 59 are latched by the source latch 31, and converted into driving voltages of the signal electrodes, first. The decompression-display data of the odd display line are transferred to the read-line buffer 57 and then latched. The display data latched in the read-line buffer 57 are latched by the source latch 31 in parallel with the process of writing, into the frame buffer memory 28, compression-display data compressed the compression circuit 56, and then converted into driving voltages of the signal electrodes.

Although no special restriction is intended, the compression and decompressions algorithm may use an image code and another algorithm. In this embodiment, a method of compressing display data into one third is adopted, which is arranged in consideration of the relations among adjacent pieces of vertical and horizontal pixel data.

As described above, the following are performed in parallel in each horizontal-scan period: a process in which display data read out from the write-line buffers (51 to 54) are compressed by the compression circuit 56, and then written into the frame buffer memory 28 as shown by the arrow PS1 of FIG. 3; and a process in which display data latched in the read-line buffer 57 are transferred to the source latch 31, and then converted into driving voltages of the signal electrodes as shown by the arrow PS4. In addition, the following are performed in series in each horizontal-scan period: a process which includes the steps of reading out compression-display data from the frame buffer memory 28, and writing them into the line latch 29 as shown by the arrow PS2; and a process which includes the steps of decompressing compression-display data output from the line latch 29, and then transferring display data of one display line to the source register 31 for display, and saving the display data of the other display line in the read-line buffer 57 as shown by the arrow PS3. In FIG. 3, the process HS of writing display data into the buffers is performed in synchronization with the operation clock (DFICK) of the display interface 21 reacts to a write from the host processor 7. The two combinations of processes shown by the arrows PS1 to PS4 of FIG. 3 are conducted in synchronization with the internal clock (OSCCK) for display control of the liquid crystal controller driver 4, but the two combinations of processes are out of synchronization with each other.

Figure 5:
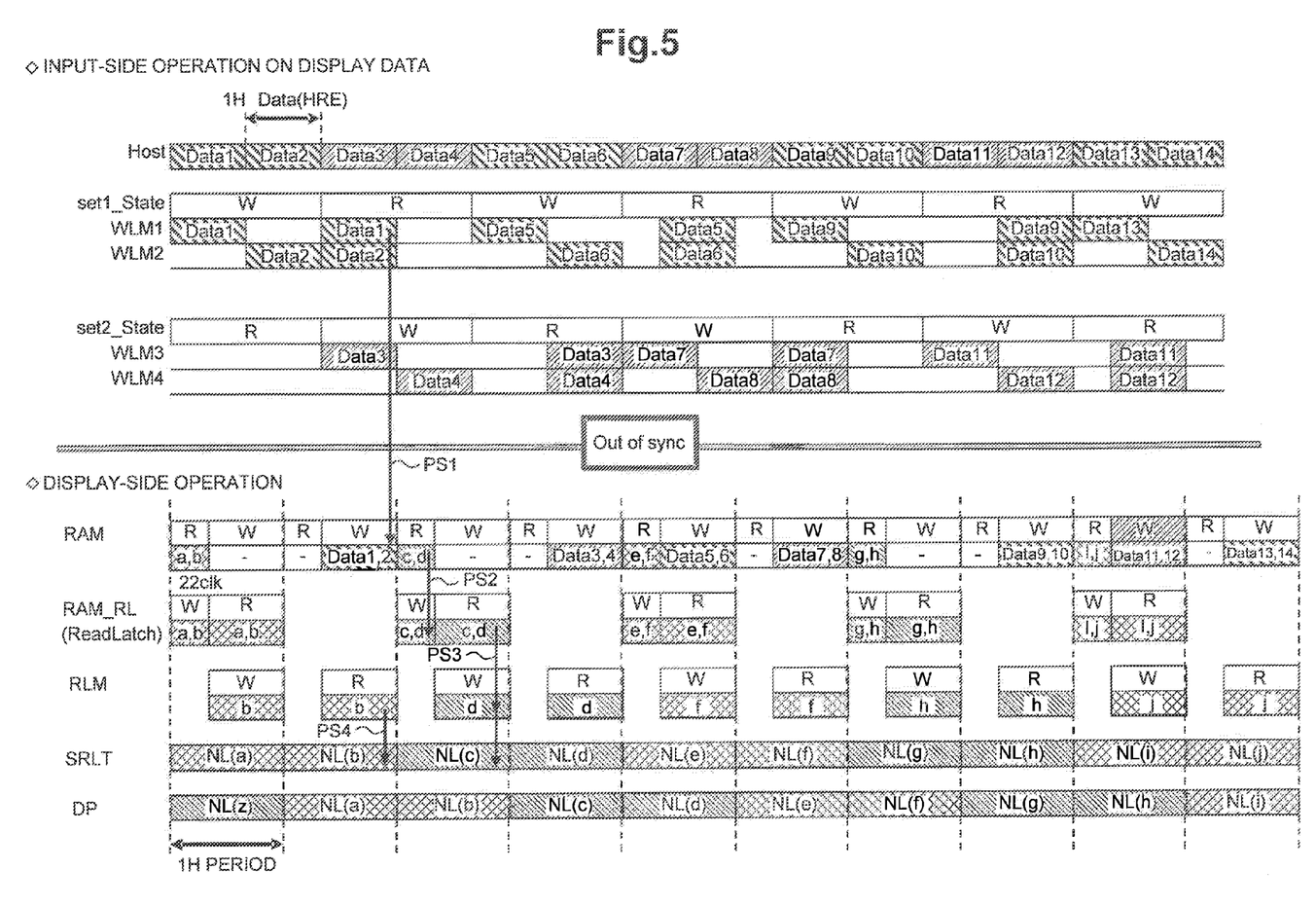
FIG. 5 is a timing diagram showing, as examples, the input-side operation timing of display data and the display-side operation timing for comparison.

FIG. 5 shows, as examples, the input-side operation timing of display data and the display-side operation timing of display data for comparison. The two operation timings are out of synchronization with each other as described above. The host processor 7 supplies display data to the display interface 21 sequentially. Display lines of display data (i.e. each corresponding to one horizontal-scan period (1H)) are shown in the drawing as Data1, Date2, Date3, etc. The number of the data is a predetermined value of 1080RGB to 720RGB. In the drawing, W represents a writing operation; R represents a reading operation; set1_State represents a process on the write-line buffers WLM1 and WLM2; and set2_State represents a process on the write-line buffers WLM3 and WLM4.

The writing of display data is performed on the write-line buffers one at a time in turn. The readout of display data is performed on the write-line buffers two at a time in parallel with the writing.

The arrows PS1 to PS4 each indicating a display-side operation timing correspond to the arrows PS1 to PS4 of FIG. 3 respectively. Data1 and Data2, which are denoted by Data1,2 in the drawing, associated with PS1 represent compression-display data which are stored in the frame buffer memory 28, and which display data Data1 and Data2 are compressed into. "c" and "d" indicated by PS2 represent compression-display data read out from the frame buffer memory 28 and latched by the line latch 29, and actually correspond to the compression-display data Data1,2, "c" corresponds to the display data Data1, and "d" corresponds to the display data Date2. NL(c) associated with PS3 represents one line of decompression-display data (corresponding to the display data Data1) latched by the source latch 31; and data "d" of the read-line buffer 57 represents the other line of decompression-display data (corresponding to the display data Data2) saved therein. Other data having suffixes 3, 4, etc. and e, f and g are in the seine correspondences as those of the above-described data.

As is clear from FIG. 5, in a display-side operation, each horizontal-scan period (1H period) consists of a first cycle (read cycle R) ranging from its start to end of a predetermined number of clock cycles, and a second cycle (write cycle W) Assuming this arrangement, the following are conducted: a process which includes the steps of outputting display data in the read-line buffer 57 to the source latch 59 (PS4) and in parallel, reading out display data from the write-line buffers, supplying the read data to the compressing part 56 to compress the data, and writing the compression-display data thus compressed into the frame buffer 28 in the second cycle (write cycle W) (PS1); a process which includes the steps of reading out the written compression-display data from the frame buffer memory 28, and latching the read data by use of the line-data latch 29 in the next first cycle (read cycle R) (PS2); and a process which includes the steps of reading out the latched compression-display data, supplying the read data to the decompressing part 30, and outputting decompression-display data to the source latch 31 and in parallel, writing the decompression-display data into the read-line buffer 57 in the subsequent second cycle (write cycle W) (PS3). The timing generating circuit 36 has the control of these processes.

According to the embodiments, the effects and advantages as described below can be brought about.

(1) Display data are read out from the write-line buffers and compressed in parallel with the process of writing display data to be compressed into the write-line buffers, besides compressing display data and storing them in the frame buffer memory 28. Therefore, the following can be conducted in time for the timing of display readily: a process which includes the steps of receiving and compressing display data from outside, and then writing the compression-display data into a frame buffer memory 28; and a reading process which includes the steps of reading compression-display data from the frame buffer memory 28. In addition, the readout executed in parallel with the writing on one write-line buffer is performed in units of a plurality of display lines of display data (i.e. lines of display data held by the write-line buffers), which offers much time to spare to the process which includes compressing and writing on the frame buffer memory 28, and the process which includes the readout from the frame buffer memory 28, and the decompression, thereby enhancing the timing margin. This contributes to the simplification of display control in a communication portable terminal device 1 and to reduction in system cost.

(2) The write-line buffers allocated to four lines are used in pairs alternately and as such, data compression with display data of adjacent display lines can be performed readily. Display data of adjacent display lines are suited to suppress the degradation of image quality in the case of image compression or the like because of pixels adjacent to each other.

(3) The compressing part 30 outputs decompressed display data of one of two lines to the source latch 59 while accumulating display data of the other line in the read-line buffer 57, and then outputs the or play data accumulated in the read-line buffer 57 to the source latch 59. Therefore, a useless decompressing operation can be eliminated. In sum, two display lines of display data obtained by one read of compression-display data from the frame buffer memory 28 and one decompression subsequent thereto are used in series in terms of the display timing and therefore, the data are never wasted.

(4) The speed at which display data are read out from the line buffers 51 to 54 (the operation speed in the read cycle R in FIG. 5) is faster than the speed (the speed in the write cycle W in FIG. 5) of data written from the display data interface 21 into the line buffers 51 to 54. Therefore, control based on hand shaking by use of write and read permissions out the like between a write operation and a read operation is never needed.

(5) The required display control can be realized readily in terms of the timing by alternately executing the following processes respectively in synchronization with the horizontal-scan period: a process which includes the steps of compressing and writing display data in the course from the write-line buffers 51 to 54 to the frame buffer memory 28, and outputting display data from the read-line buffer 57 to the source latch 59; and a process which includes the steps of reading out compression-display data from the frame buffer memory 28, decompressing the compression-display data, outputting the decompressed display data of one line to the source latch, and saving the decompressed display data of the other line by use of the read-line buffer 57.

The invention is not limited to the above embodiments. It is apparent that various changes and modifications may be made without departing from the subject matter thereof. The compression and decompression algorithms are limited to nothing, and an appropriate algorithm may be adopted therefor. The number of the write-line buffers is not limited to four. It may be any number as long as it is no less than two. On condition that four or more write-line buffers are incorporated as in the above embodiment, the display data can be read out from the write-line buffers in parallel when writing display-line data into the write-line buffers, one at a time as shown in FIG. 5. Thus, it becomes easier to ensure a relatively large operation margin for the compression process, the access to a frame buffer and the decompression. The invention is not limited to the applications to communication portable terminal devices including portable telephones, and smart phones. The invention can be widely applied to data processing systems including relatively large data-processing pads and personal computers. The display control device of the invention can be also applied to a system other than a data processing system having a touch panel.

What is claimed is:

1. A display control device comprising:
   a display data interface which is supplied with display data from outside;
   a plurality of line buffers serving as buffer regions, and arranged so that a writing process for writing each display line of display data output from the display data interface into part of the buffer regions, and a reading process for reading out display lines of display data written therein from other parts of the buffer regions can be conducted in parallel;
   a compressing part for compressing display-line data read out from the line buffers;
   a frame buffer memory for storing compression-display data subjected to compression by the compressing part;
   a decompressing part for reading out compression-display data from the frame buffer memory for each line, and decompressing the compression-display data into display lines of display data; and a driving part for outputting driving voltages for driving signal electrodes of a display device by use of decompressed display data.

2. The display control device according to claim 1, wherein the plurality of line buffers consist of four line buffers;

the four line buffers are made a line buffer to write display data into in turn; and the four line buffers are made, in pairs, line buffers to read out display data from in parallel, provided that each pair of the line buffers are allocated to adjacent two display lines.

3. The display control device according to claim 2, wherein the decompressing part outputs decompressed display data of one of two lines to the driving part while accumulating display data of the other line in the delay buffer, and then outputs the display data accumulated in the delay buffer to the driving part.

4. The display control device according to claim 3, wherein readout of display data from the line buffers is faster than write of display data into the line buffers from the display data interface in speed.

5. The display control device according to claim 4, further comprising a timing generator, wherein each horizontal-scan period consists of a first cycle ranging from its start to end of a predetermined number of clock cycles, and second cycle, the timing generator controls: a process which includes the steps of outputting, to the driving part, the display data of the accumulation buffer and in parallel, reading out display data from the line buffers, supplying the read data to the compressing part to compress the data into compression-display data, and writing the compression-display data thus compressed into the frame buffer memory in the second cycle;

a process which includes the steps of reading out the written compression-display data from the frame buffer memory to latch the read data in a line data latch circuit in the subsequent first cycle; and a process which includes the steps of reading out the latched compression-display data, supplying the read data to the decompressing part, and outputting the display data thus decompressed to the driving part and in parallel, writing the display data into the accumulation buffer in the subsequent second cycle.

6. A data processing system comprising:

a microcomputer for executing a program;

a display control device for performing display control of display data supplied by the microcomputer;

a display device for displaying display data based on driving voltages output by the display control device;

a touch panel having a plurality of drive electrodes, a plurality of detection electrodes, and a plurality of crossing parts formed by the drive and detection electrodes, and disposed on the display control device; and a touch panel controller which drives the drive electrodes of the touch panel to detect a detection signal from each detection electrode, wherein the display control device including:

a display data interface which is supplied with display data from outside;

a plurality of line buffers serving as buffer regions, and arranged so that a writing process for writing each display line of display data output from the display data interface into part of the buffer regions, and a reading process for reading out display lines of display data written therein from other parts of the buffer regions can be conducted in parallel;

a compressing part for compressing display-line data read out from the line buffers;

a frame buffer memory for storing compression-display data subjected to compression by the compressing part;

a decompressing part for reading out compression-display data from the frame buffer memory for each line, and decompressing the compression-display data into display lines of display data; and a driving part for outputting driving voltages for driving signal electrodes of a display device by use of decompressed display data.

7. The data processing system according to claim 6, wherein the plurality of line buffers consist of four line buffers;

the four line buffers are made a line buffer to write display data into in turn; and the four line buffers are made, in pairs, line buffers to read out display data from in parallel, provided that each pair of the line buffers are allocated to adjacent two display lines.

8. The data processing system according to claim 7, wherein the decompressing part outputs decompressed display data of one of two lines to the driving part while accumulating display data of the other line in the delay buffer, and then outputs the display data accumulated in the delay buffer to the driving part.

9. The data processing system according to claim 8, wherein readout of display data from the line buffers is faster than write of display data into the line buffers from the display data interface in speed.

10. The data processing system according to claim 9, further comprising a timing generator, wherein each horizontal-scan period consists of a first cycle ranging from its start to end of a predetermined number of clock cycles, and a second cycle, the timing generator controls: a process which includes the steps of outputting, to the driving part, the display data of the accumulation buffer and in parallel, reading out display data from the line buffers, supplying the read data to the compressing part to compress the data into compression-display data, and writing the compression-display data thus compressed into the frame buffer memory in the second cycle;

a process which includes the steps of reading out the written compression-display data from the frame buffer memory to latch the read data in a line data latch circuit in the subsequent first cycle; and a process which includes the steps of reading out the latched compression-display data, supplying the read data to the decompressing part, and outputting the display data thus decompressed to the driving part and in parallel, writing the display data into the accumulation buffer in the subsequent second cycle.

11. The data processing system according to claim 10, further comprising a high-frequency interface for performing high-frequency wireless communication under control of the microcomputer, which is formed as a portable communication terminal device.

12. The data processing system according to claim 9, further comprising a high-frequency interface for performing high-frequency wireless communication under control of the microcomputer, which is formed as a portable communication terminal device.

13. The data processing system according to claim 8, further comprising a high-frequency interface for performing high-frequency wireless communication under control of the microcomputer, which is formed as a portable communication terminal device.

14. The data processing system according to claim 7, further comprising a high-frequency interface for performing high-frequency wireless communication under control of the microcomputer, which is formed as a portable communication terminal device.

15. The data processing system according to claim 6, further comprising a high-frequency interface for performing high-frequency wireless communication under control of the microcomputer, which is formed as a portable communication terminal device.

* * * * *